(No Model.)

W. BARRETT.
HAY AND STRAW CUTTER.

No. 326,382. Patented Sept. 15, 1885.

Witnesses:
Robert Barrett
Jo. L. Coombs

Inventor:
William Barrett
By James L. Norris
Atty.

UNITED STATES PATENT OFFICE.

WILLIAM BARRETT, OF SEDALIA, MISSOURI.

HAY AND STRAW CUTTER.

SPECIFICATION forming part of Letters Patent No. 326,382, dated September 15, 1885.

Application filed August 30, 1884. (No model.)

*To all whom it may concern:*

Be it known that I, WILLIAM BARRETT, a citizen of the United States, residing at Sedelia, in the county of Pettis and State of Missouri, have invented new and useful Improvements in Hay and Straw Cutters, of which the following is a specification.

This invention relates to hay and straw cutters; and it consists in certain improvements upon the apparatus for which Letters Patent of the United States were granted me the 8th day of February, 1881, No. 237,466.

The invention consists more particularly in the combination, with the reciprocating knife, of a detachable pitman connected with a wrist-pin upon a shaft mounted in bearings in the lower part of the frame, said shaft having a band-pulley, which may also serve as a fly, whereby the cutter may be operated by hand either with or without the fly to assist the stroke, or be run by power, as circumstances may require.

Figure 1:
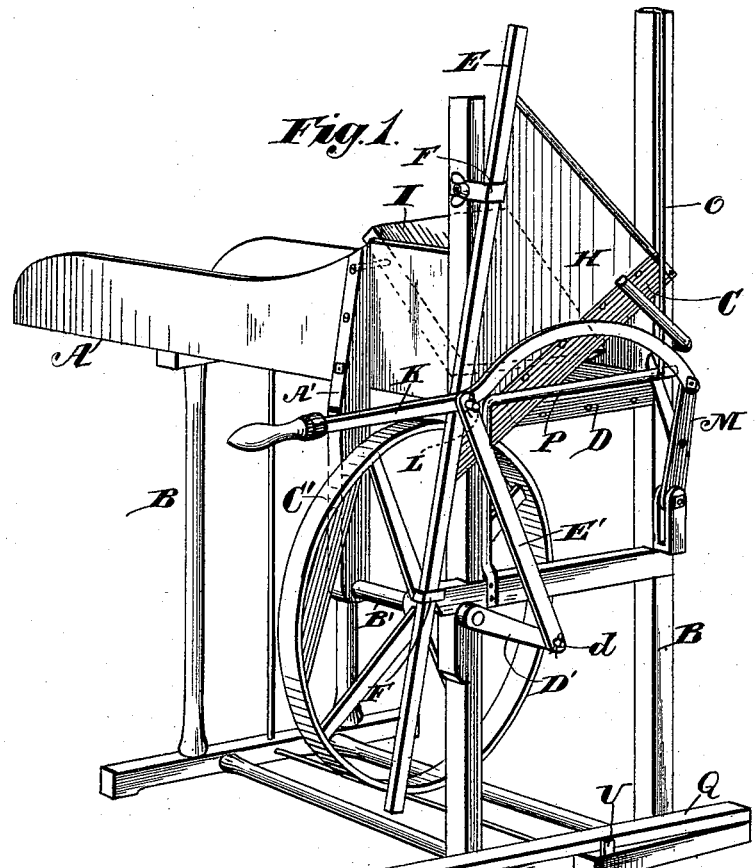
Figure 2:
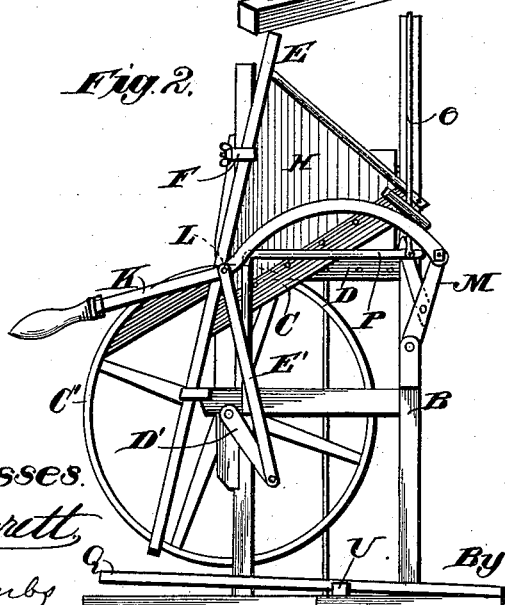

Referring to the drawings, Figure 1 is a perspective view of a hay and straw-cutting machine embodying my improvements. Fig. 2 is an end elevation.

The letter A in the drawings designates the feed-trough, which is supported upon a suitable frame, B, of the usual construction. C indicates the reciprocating knife, which is arranged to operate at the forward end of the feed-trough, and D is the stationary knife secured to the end of the trough, arranged to act in conjunction with the knife C. The cutting-edge of the latter is arranged at an angle of forty-five degrees with the stationary knife D, or thereabout, and is carried by an inclined knife-bar, E, moving in loops or guides, F F, mounted upon the machine-frame. An inclined brace-bar connects the upper end of the knife with the knife-bar E, and the triangular space between the knife-bar, knife, and brace is closed by a sheet-metal plate, H, so that in lifting the knife it will be impossible for the ends of the hay or straw to project over and be raised by the ascending knife. For the purpose of holding the hay down, I pivot within the trough just behind the knife a board, I, the edge of which rests upon the hay or straw with a yielding pressure as the latter is fed along the trough.

The knife C may be reciprocated by a handle, K, having its end pivoted to a toggle-link, M, pivotally mounted upon the end of the frame B. The body of the handle is curved upward in order that it may not obstruct the opening between the knives through which straw or hay is fed, and it is pivoted to the knife-bar E by means of a stud or bolt, L. A suitable grasp is formed at the end, and by operating this handle the knife may be operated, being guided by a vertical bar, O, secured to one of the end standards of the main frame. A right-angled bar or plate, P, extends horizontally a little in front of the stationary knife, and the knife C reciprocates between the two, the said arm supporting the projecting portions of the hay or straw while being severed.

At the base of the machine is arranged a spring-plate, Q, in position to be acted upon by the knife-bar after the latter has been depressed, so as to take up the shock and aid the upward movement of the knife. This plate is held in place by a loop or clip, U, and may be readily removed, if desired.

To one side of the trough I bolt a bar, A', parallel with one of the end standards at the forward end of the machine. This bar forms a drop-bearing for one end of a shaft, B', the other end being journaled in the end standard opposite. Upon this shaft is mounted a band-pulley, C', having such weight that it may, if desired, be used as a fly. Upon the end of said shaft which projects in front of the standard in which it is journaled is mounted a crank-arm, D', having a wrist-pin, d, to which is connected one end of a pitman, E', having its other end pivotally connected to the stud or bolt L, by which the handle K is connected with the knife-bar.

By running a band over the pulley C' the cutter C may be driven by power, or by removing said band it may be operated by hand, the pulley C' having weight sufficient to give it the function of a fly-wheel; or, if desired, the pitman E' may be disconnected or the pulley C' removed.

I am thus able, by the addition of very few and simple parts, to use this form of cutter in three separate ways. The fly may be used, in conjunction with the spring-plate U, to regulate and assist the stroke, and, if desired, said plate may be removed when the apparatus is run by power.

Upon the toggle M is mounted a thin plate, m, which projects upward, lying between the stationary knife D and the bar P. The function of this plate is to prevent the hay or straw clogging at the point of the reciprocating cutter C. This is effected by the lateral oscillation of the plate M at each reciprocation of the knife.

The peculiar shape of the handle K enables the machine to be operated, when the fly-wheel is attached, to better advantage.

Having thus described my invention, what I claim is—

1. In a hay or straw cutter, the combination, with the reciprocating knife carried by a knife-bar, of a handle pivoted to the latter while its end is connected with a toggle-link upon the frame, a shaft journaled below said knife and carrying a band-pulley, a crank-arm upon the end of said shaft, and a pitman connecting said crank with the knife-bar, whereby the cutter may be operated by hand or by power, substantially as described.

2. In a hay-cutter, the combination, with the reciprocating knife, the knife-bar having a projecting lower end, a shaft journaled below said knife and carrying a band-pulley, a crank-arm upon the end of said shaft, a pitman connecting said crank-arm and knife-bar, and a spring-plate beneath the end of the knife-bar to take up the shock caused by a reversal of movement and the upward reciprocation of the knife, substantially as described.

3. The combination, with the stationary knife D and reciprocating cutter C, of the actuating-handle K, toggle-link M, and clearing-plate m, substantially as described.

4. The combination, with the knife D, reciprocating cutter C, and actuating-handle K, pivoted upon a toggle-link M, of a clearing-plate, m, mounted rigidly upon said toggle-link, and a bar, P, between which and the knife D the plate reciprocates, substantially as described.

In testimony whereof I have hereunto set my hand in the presence of two subscribing witnesses.

WILLIAM BARRETT.

Witnesses:
E. C. JOHNSON,
EBEN E. CLARK.